United States Patent [19]

Van Ackeren et al.

[11] 4,155,725
[45] May 22, 1979

[54] DUST REMOVAL FROM SMOKE GAS OR THE LIKE

[75] Inventors: Paul Van Ackeren, Duisburg; Helmut Gauter, Duisberg-Mündelheim; Heinz Dahlmann; Wilhelm Thielmann, both of Duisburg, all of Fed. Rep. of Germany

[73] Assignee: Mannesmann Aktiengesellschaft, Düsseldorf, Fed. Rep. of Germany

[21] Appl. No.: 773,018

[22] Filed: Feb. 28, 1977

[30] Foreign Application Priority Data

Feb. 27, 1976 [DE] Fed. Rep. of Germany ....... 2608004

[51] Int. Cl.² ............................................ B01D 47/10
[52] U.S. Cl. ........................................ 55/210; 55/226; 55/270; 55/385 D; 55/467; 261/DIG. 56; 266/80; 266/158
[58] Field of Search ............. 55/213, 226, 270, 385 D, 55/393, 467, 210; 261/DIG. 9, DIG. 54, DIG. 56; 266/87–89, 147, 157, 158, 80; 415/151

[56] References Cited

U.S. PATENT DOCUMENTS

| | | | |
|---|---|---|---|
| 2,140,148 | 12/1938 | Whitmore | 415/151 |
| 3,177,065 | 4/1965 | Okaniwa et al. | 261/DIG. 54 |
| 3,237,564 | 3/1966 | Hartland | 415/151 |
| 3,559,970 | 2/1971 | Hamare et al. | 266/87 |
| 3,630,496 | 12/1971 | Hurst et al. | 261/DIG. 54 |
| 3,668,825 | 6/1972 | McIlvaine | 55/270 |
| 3,726,065 | 4/1973 | Hausberg et al. | 55/226 |
| 3,993,460 | 11/1976 | Gooch et al. | 55/270 |
| 4,052,042 | 10/1977 | Hegemann et al. | 55/213 |

FOREIGN PATENT DOCUMENTS

47-14603 1/1972 Japan ..................................... 266/158

*Primary Examiner*—Frank W. Lutter
*Assistant Examiner*—David L. Lacey
*Attorney, Agent, or Firm*—Smyth, Pavitt, Siegemund, Jones & Martella

[57] ABSTRACT

The dust removal plant is comprised of a fan with adjustable guide vanes and a ring gap scrubber with adjustable gap width. A first feedback loop controls the scrubber operation through gap width control for maintaining a constant residual dust content of the gas as discharged, a second feedback loop keeps the pressure constant at the scrubber intake by adjusting the guide vanes. Both feedback loops reduce the power consumption of the fan for periods of low dust development. The apparatus is explained with reference to cleaning of smoke gas discharged from a blowing steel converter.

9 Claims, 3 Drawing Figures

DUST REMOVAL FROM SMOKE GAS OR THE LIKE

BACKGROUND OF THE INVENTION

The present invention relates to dedusting of, for example, smoky gas as emerging from steel furnaces, converters, or other, similar type heavy dust sources.

The equipment for dedusting smoke gas is usually comprised of a scrubber with a variable cross-section and a blower or fan having adjustable guide vanes for swirl flow control. The scrubbers are, for example, of the ring or annular gap, or of the venturi variety. Guide vanes adjustment is to refer broadly to means for changing the lifting height or stroke of the fan and/or throughput of the fan, i.e., the quantity of gas moved by the fan per unit time.

Steel converters develop dust in highly variable quantities. The deduster must operate at a very high or maximum scrubbing capacity during peak periods of dust development, e.g. during blowing of the converter. However, as the dust development goes down, e.g., upon cessation of the blowing phase, the deduster continues to produce the same pressure drop and its motor continues to consume a high amount electric power and energy.

DESCRIPTION OF THE INVENTION

It is an object of the present invention to improve operation of a scrubber in a dust removing plant to reduce the average power requirements.

In accordance with the preferred embodiment of the present invention, it is suggested to continuously monitor the residual dust content as discharged by the scrubber to control the scrubber so that the fan thereof consumes only as much power as is needed to maintain the particular residual dust content constant.

In furtherance of the invention, it is suggested to use a scrubber with a variable annular gap and a blower or fan with adjustable guide vanes. A first feedback loop controls the scrubber action to maintain the residual dust content constant by, for example, varying the gap width of the scrubber entrance. A second feedback loop corrects the mass flow through the scrubber in that, for example, the stationary blower vanes are adjusted. The combination of the two feedback loops keeps the power requirements for the blower fan at the needed minimum, so that particularly in phases of low dust development, the power consumption can and will be reduced, the deduster will not work consistently at maximum (or very high) capacity. The invention will find particular utility in those cases where the dust development varies to a considerable extent. Such is the case, for example, in steel converters, developing heavy smoke gas during blowing, while comparatively little dust is developed during other phases of the operation. During these phases, scrubber action and particularly the power consumption of dust removal action will be reduced.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 3:
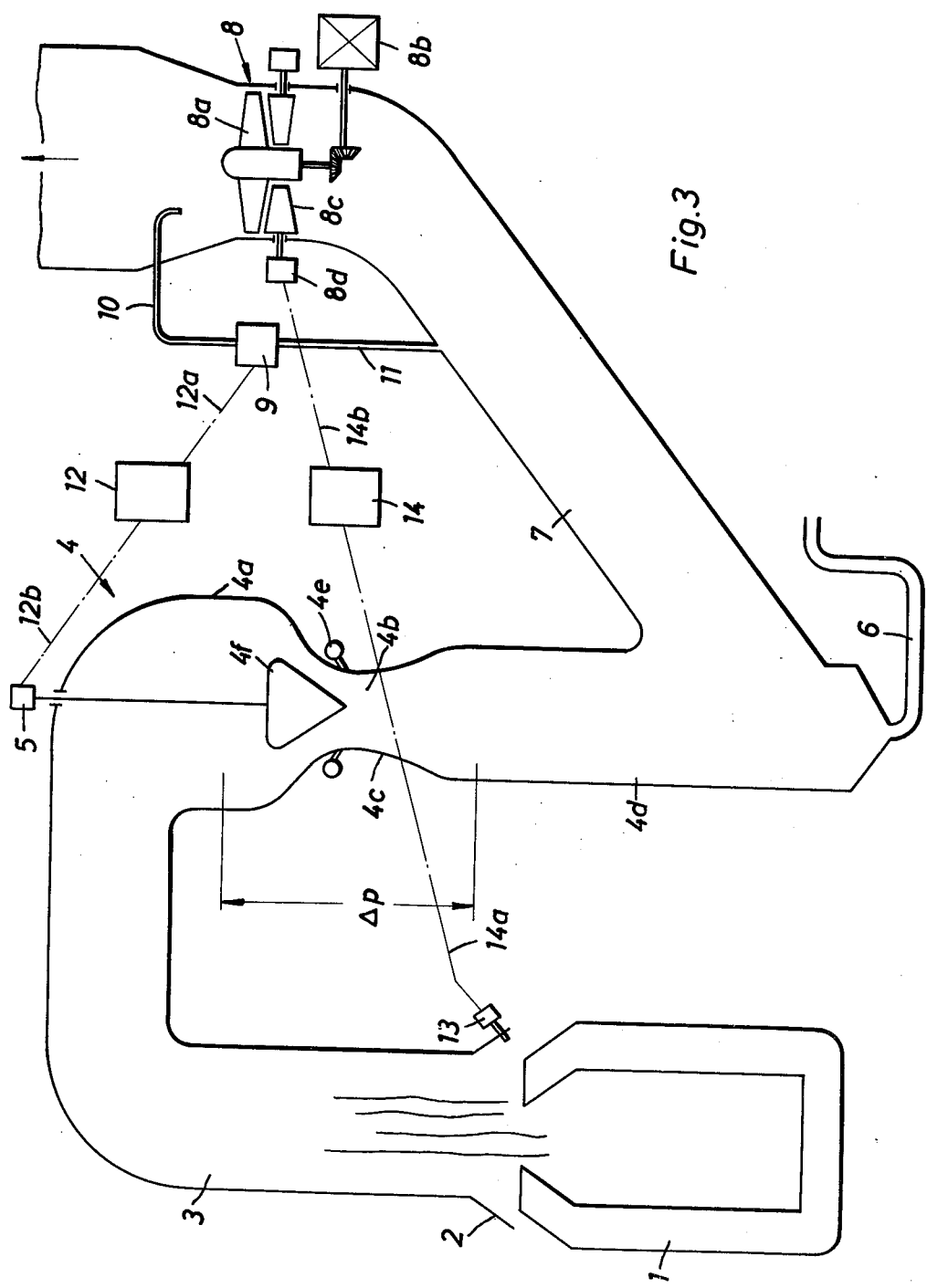
FIG. 3 is a schematic view of a steel converter with dust removal equipment in accordance with the preferred embodiment of the invention.

Proceeding now to the detailed description of the drawings, and referring particularly to FIG. 3, a blowing steel converter 1 of conventional construction is provided with a hood 2 communicating with a discharge pipe 3. This pipe leads to and feeds a ring gap scrubber 4.

Scrubber 4 includes an entrance and/or collection chamber 4a in which pipe 3 terminates. The chamber 4a narrows in venturi-type fashion to a throat portion 4b of variable cross-section which limits the width of the flow path for the smoke and gas and is continued in a conically widened portion 4c leading towards the scrubbing chamber 4d.

The cross-section of the throat portions 4b is adjusted by a conical member 4f which can be raised or lowered by means of an adjusting member such as a motor 5. Reference numeral 4e refers to an annularly arranged water spray equipment, discharging water jets into the throat and gap portion 4b to obtain scrubbing.

The bottom of the scrubbing chamber 4d is provided with an outlet connected to a syphon type outlet 6 for the discharge of water from the scrubbing chamber. The water contains, of course, most of the dirt and dust that was blown into pipe 3.

A suction pipe 7 leads upwardly from the lower portion of chamber 4d through which a fog like, wet smoke gas is fed as carrier gas of the residual dust towards a fan or blower. This fan 8 discharges the gas out of the system. The blower operation establishes the suction flow through pipe 7 and through the scrubber.

It will be appreciated that the rather narrow annular gap between throat portion 4b and cone 4f in the entrance section of the scrubber constitutes a dominating factor in the flow impedance. Most particularly, the variable disposition of cone 4f establishes different (parabolic) duct characteristics for the fan.

The fan 8 is illustrated in a somewhat simplified manner and as an axial type propeller fan, but preferably one will use a radial or centrifugal fan for reasons of the needed pressure conditions. The stationary portion of the fan includes a plurality of guide vanes 8c which modify the relationship between the rate of flow of gas passing through and fan pressure. Reference numeral 8d denotes the adjustment mechanism for these vanes or blades 8c for swirl flow guiding and control.

The fan is driven by a constant speed motor 8b or is controlled to operate at constant speed so that its power consumption varies directly with the load conditions. The load conditions, in turn, are modified primarily by the annular gap in the scrubber on account of the variable position of cone 4f.

A photometrically operating dust detector 9 is positioned in the path between a suction input duct 10 and a suction duct 11. Suction is provided at the opening of duct 11 through pipe 7, while gas is sampled through duct 10.

The sampled gas passes through a detector 9 which responds to air turbidity and provides an electrical output which is representative of the dust content (per unit volume) as discharged from pipe 7.

The equipment shown in FIG. 3 includes in addition two feedback control loops. A first one has the photometer 9 as condition sensing input element and feeds its output to a control circuit 12 via a line 12a. The control circuit 12 is of conventional design and compares, for example, the signal from detector 9 with a reference signal representing a particular dust content. The resulting error signal is duly amplified and converted into an actuation or operation signal, which is fed via a line 12b to motor 5.

Motor 5 adjusts, moves and positions cone 4f, being the immediate actuator for that control loop. The position of cone 4f determines (or changes, or modifies) the gap of the scrubber, which affects directly the action of the scrubber and the load on the fan.

The loop is closed through the dust laden gas being cleaned and scrubbed and discharged via pipe 7, by operation of fan 8. The cleanliness of that outflow is monitored by the photometer 9 through its input 10. The first feedback loop is adjusted so that the dust content of the gas as discharged remains constant. Lowering or raising the cone 4f intensifies or reduces the scrubber action accordingly.

The second control loop includes, as an input transducer, a pressure sensing device 13 to monitor the pressure in the gap between converter 1 and hood 2. A signal line 14a connects transducer 13 to a control circuit 14, whose output is fed via line 14b to the adjusting device 8d. The loop is closed through the flow path from hood 2 through the scrubber and the blower 8.

The control circuit 14 is also designed for feedback control in that the signal from transducer 13 is compared with a reference signal representing desired pressure in that hood duct. The circuit 14 issues actuation or adjusting signals for controlling the position of the guide vanes 8c. As will be explained more fully below, adjusting the position of vanes 8c varies the throughput of the blade as well as the fan pressure. This second control loop is now adjusted, so that a particular constant pressure is maintained at the hood gap. That pressure is selected to prevent any flow of gas or air through the gap in either direction.

In particular, this second control loop avoids that a low pressure at the hood entrance causes external air to be drawn into the hood, because the fan should draw off just the converter gas and should not be loaded additionally by drawing air that does not beed scrubbing. On the other hand, the pressure at the hood gap should not be too large either, because converter gas must not be discharged into the outer air without having first passed through the scrubber. Thus, this loop operates to prevent any flow through the hood gap either way.

Before proceeding to the detailed description of the operation of this particular system, some general considerations are in order. In many instances, a particular dust content for discharge into the outer atmosphere must not be exceeded, because such a limit is set by law, regulation or otherwise. This, of course, applies particularly to heavy dust producers such as blowing steel converters, but is true in many other instances. For example, such a legal dust content limit may be 150 milligrams per mole cubic meter gas discharged.

In order to ensure that this or any other value set by law is not exceeded, a dust content control must operate well below that limit so that a sufficient margin of safety exists. Equipment failure or unforseen more-than-normal dust development must not result in an excess discharge as permitted. On the other hand, reducing the dust content too much below the prescribed limit may require, in total, excessive amounts of energy which is also undesirable. This aspect should be considered with particular care. It appears, on a superficial basis, desirable to clean the discharged gases as much as possible, to let the scrubber run at full power even if little dust is temporarily produced (such as during operational phases of a converter other than blowing). However, the scrubber consumes power also which is generated somewhere. More often than not, the power is produced under air polluting conditions. Thus, it makes little sense to remove an amount X of dust from the air by scrubbing while consuming energy whose production produces an amount of pollutant Y whereby Y (if dust) is larger than X or, a different type of pollutant being more harmful. Therefore, it is indeed undesirable to clean the discharged gas too much.

In view of the foregoing, it is indeed reasonable to select a controlled value for a residual dust content to be maintained on a regular basis which is a trade off of these two constraints: legal limit vs. excess energy consumption. By way of example, a steady dust content of $\frac{2}{3}$ the legal limit is a reasonable compromise which is about 100 mg/Nm$^3$. The inventive system is designed to maintain such a level of residual dust content.

Figure 1:
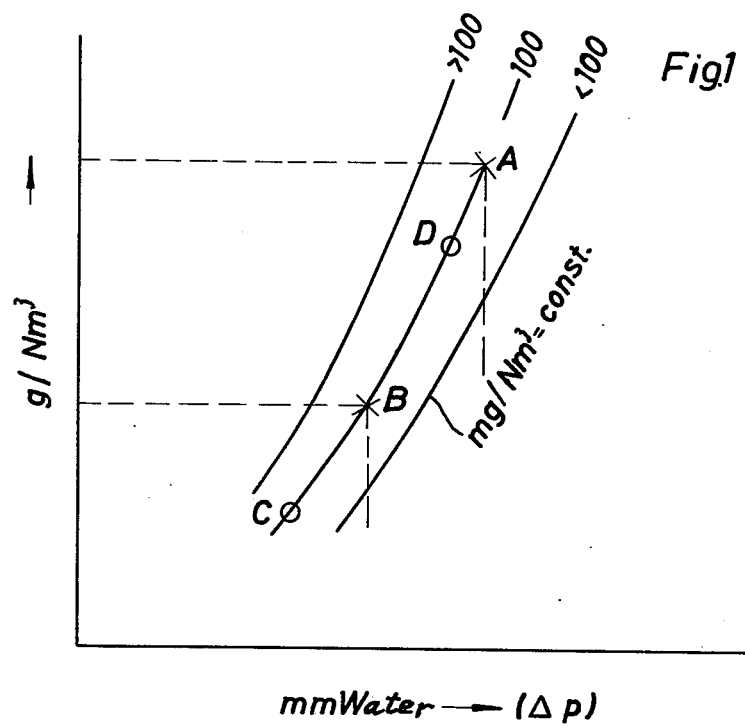
FIG. 1 is a plot of characteristics of a ring gap scrubber wherein dust removed is plotted against pressure drop, and demonstrating two particular cases of controlled action.
Figure 2:
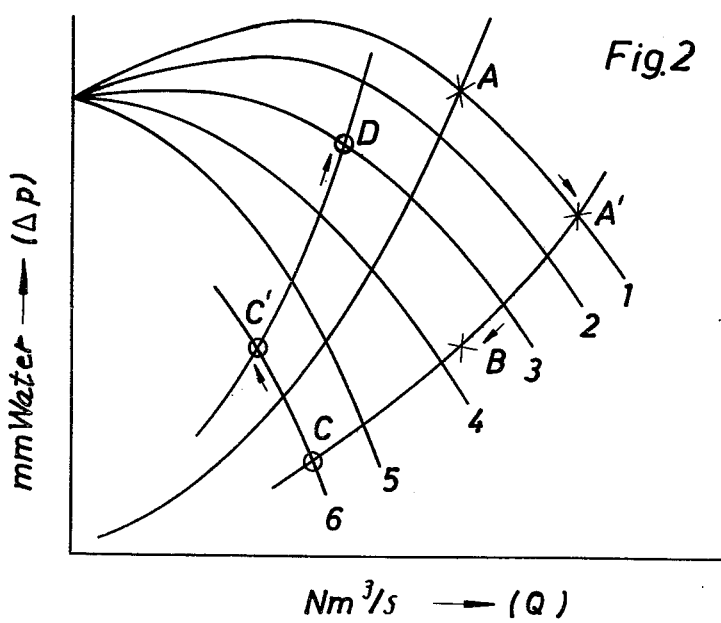
FIG. 2 is a plot of a family of curves wherein pressure drop is plotted against fan throughput, representing the characteristics of a radial or centrifugal fan with adjustable guide vanes for swirl flow modification, some flow resistance curves (dust characteristics) are superimposed, and the Figure demonstrates also the two particular cases.

As an introduction to the description of the operation of the equipment and how it maintains this particular dust content of 100 mg/Nm$^3$ in the discharge path to the outer atmosphere, FIGS. 1 and 2 shall be discribed briefly and generally.

FIG. 1 illustrates the scrubber operation in terms of extracted dust on a basis of grams dust per mole cubic meter gas versus pressure drop in the scrubber, whereby, of course, the annular gap is the variable factor. If the other factors are similar, one can also say that $\Delta P$ is (or can be plotted on an appropriately selected abscissa scale) the pressure produced by the fan. It should be noted further that the ordinate could also be interpreted as dust content of the gas input to the scrubber which does not change the representation in principle.

Each of the characteristics as plotted in FIG. 1 represents a constant residual content dust as parameter. The central curve represents, e.g., 100 mg/Nm$^3$, and to keep this value constant the pressure differential (=suction) of the fan must vary to obtain the requisite dust extraction so that the residual content remains constant. The two other curves in FIG. 1 assume, respectively, larger and smaller residual contents. For purposes of explaining the invention, the curve with the parameter 100 mg/Nm$^3$ is to be used.

FIG. 2 represents the operating characteristics of the fan and has duct characteristics (parabolas) superimposed. As to the fan characteristics, fan pressure is plotted against the rate of gas passing through the scrubber and fan in units of mole cubic meters per seconds (Q). The curves are identified by parameters 1 through 6, which are actually arbitrary numbers, merely identifying different positions of the guide vanes of the fan. Thus, for each such position, fan or blower 8 operates along a particular $\Delta P$-Q characteristics.

The second family of curves in FIG. 2 are three duct characteristics representing the load on the fan. These curves are parabolas and their parameter represents different gap sizes in throat 4b, or which means the same thing, different positions of cone 4f. Thus, for a given gap width, the duct offers a resistance parabola as duct characteristics to the fan. A given gap and a particular adjustment of the stationary guide means of the fan is represented by an intersection of two curves, one per family, which becomes the operating point of the fan-scrubber system.

After these particulars, I proceed to the description of specific examples as far as the operation of the device is concerned. It is, first of all, assumed that the dust removal equipment is to be controlled to maintain a residual dust content of 100 mg/Nm$^3$. It may be assumed that (a) the cone 4f has a particular disposition so that the duct system has a particular characteristics as represented by one of the parabolas in FIG. 2; (b) the vanes or blades 8c have an adjusted position so that the currently valid fan characteristics is the curve with parameter 1. Accordingly, the system is at operating point A. (c) In view of the fact that the fan-duct system is adjusted to a particular pressure $\Delta P$, and in further view of the fact that the first control loop is presumed to operate towards a particular residual dust content of 100 mg/Nm$^3$, the scrubber operates at point A in FIG. 1. This operation as assumed thus far has validity only if the corresponding ordinate value for point A in FIG. 1 represents the actual dust content of the gas as charging the scrubber (or as removed by the scrubber). In other words, it is assumed that the system has adjusted itself to that particular dust content to obtain a residual dust content of 100 mg/Nm$^3$. This dust content as per the ordinate of FIG. 1 is presumed to occur at maximum normal converter output during blowing.

It is now assumed that the dust content of the converter discharge gas drops. Detector 9 responds and signals the decline in dust content to controller 12 which causes motor 5 to lift the cone 4f. Consequently, the resistance in the throat 4b declines, and the new cone position establishes another (lower) resistance curve, corresponding to a wider ring gap. Thus, operating point A on curve 1 in FIG. 2 may shift to point A$^1$, corresponding to a different duct characteristics, but for the same fan characteristics. Consequently, the amount of gas moved by the fan increases, and the pressure differential $\Delta P$ drops. This is being picked up by the pressure meter 13 because the increase in gas moved causes outside air to be sucked into the hood 2. The meter 13, therefore, detects a pressure drop and signals this follow-up interference to controller 14 accordingly.

The controller 14 operates the actuator 8d and adjusts the guide vanes 8c so that different characteristics of the fan comes into play. Since the cone 4f does not participate directly in this action, the flow resistance in throat 4b will remain constant, so that the operating point shifts from point A$^1$ along the new parabolic resistance curve through that point to, say, point B, which represents again a stable state of no-flow through the hood gap.

The resulting new value for the fan pressure $\Delta P$ causes, also a different operating point on the scrubber characteristics which is also designated B in FIG. 1. The change in $\Delta P$ is, of course, only indirectly responsible for the drop in scrubbing efficiency, the primary cause here being the widening of the gap at the throat where the water jets are effective. The amount of dust removed will drop and the continued detecting and monitoring action of photometer 9 and the action of controller 12 make sure that the cone 4f has a position so that indeed the right amount of dust is removed to maintain a residual content of 100 mg/Nm$^3$. Thus, FIG. 2, as far as this operating point B is concerned, is only a first order approximation because each change in position of cone 4f brings a different resistance curve into play. The final operating point as per FIG. 2 may be a little off the location of point B therein. This, however, does not change the principles involved, and the first control loop will make sure that the new operating point is on the 100 mg/Nm$^3$ characteristic.

It should also be noted that the fan pressure and fan power consumption is reduced twice by this action of the two control loops. The first reduction occurred on the basis of a straight forward feedback operation for maintaining the residual dust content constant, but that did result in some additional suction of external air through the hood gap. The second reduction occurred for stopping that inflow of air. This, in effect, amounts to an additional saving in fan power.

It can thus be seen that the primary control loop tracked the dust content and development to adjust the scrubber accordingly, and the secondary control loop adjusted the fan pressure so that the fan draws the exact amount of gas from the converter via the hood.

A different example may proceed as follows. It may be assumed that for some reason the guide vanes 8c had been adjusted so that the low fan characteristic curve 6 has validity. It is also assumed that the cone 4f has the same position as for operating point B. Thus, the duct resistance characteristics through that point in FIG. 2 is the valid one in this instance, and its intersection with curve 6 defines the currently valid operating point C.

We still assume that 100 mg/Nm$^3$ is the desired residual dust content so that the corresponding point C of the scrubber characteristics is also on that curve (FIG. 1). The amount of dust to be extracted is quite low.

Now it may be assumed that the dust content discharged by the converter increases. Photometer-detector 9 responds and control 12 generates error signal which signals a lowering of the cone to throttle the flow. The operating point thus shifts from C to C$^1$ along curve 6. The resulting change in quantities moved causes pressure meter 13 to signal an outflow of gas from the converter through the hood gap, and controller 14 causes device 8d to adjust the vanes or blades 8c, so that a different fan characteristics is approached. The change causes the operating point to shift along the resistance curve (cone 4f remaining stationary) through C$^1$ (or approximately therealong) to move towards a new point D. The resulting change in $\Delta P$ causes a further increase in scrubber efficiency, and the operating point as per FIG. 1 shifts from C therein to a corresponding new point D. This point D is, of course, also located on the 100-curve in FIG. 1, and the fan pressure $\Delta P$, effective primarily in the scribber is just sufficient to maintain a dust extraction action so that the residual dust content remains 100 mg/Nm$^3$.

It can thus be seen that the driving power of the blower motion is always just sufficient to remove the particular excess dust from the gas to maintain the desired residual content. This amounts to a significant saving in wattage for the blower motor, because the full or rated power needed for such a device is in the range of megawatts. As was mentioned above, the contamination of the environment by the power station on account of the particular maximum electric power for maintaining maximum scrubbing action and reducing the residual dust content below the 100 mg/Nm$^3$ limit, may be greater than the additional contamination produced by the deduster by never going below that 100 mg/Nm$^3$ limit, so that in the balance the overall contamination of the environment is reduced.

The invention is not limited to the embodiments described above but all changes and modifications thereof not constituting departures from the spirit and scope of the invention are intended to be included.

We claim:

1. In an apparatus comprising duct means for removing dust from smoke gas developed by a source, the apparatus having an intake adjacent to the source of the gas, a scrubber disposed in the duct means downstream from the intake and a motor driven fan means in the duct means for drawing the gas into the intake and through the scrubber, the scrubber being adjustable as to scrubbing action by adjustment means, the improvement comprising:

first detector means disposed in the duct means, downstream from the scrubber for detecting the residual dust content of the gas as it leaves the scrubber through the duct means;

first control means connected to and operated by the means for detecting, and further connected to said adjustment means to control the scrubber for obtaining a constant residual dust content, and the operation of the adjustment means changes the flow conditions in the duct means;

second detector means positioned in the duct means and responsive to flow conditions in the duct means at a location upstream of the fan means; and second control means connected to the second detector means and to the fan means to operate the fan means in response to the flow conditions upstream of the fan means for reducing or increasing the power requirement for the fan means, said flow conditions varying in response to increasing or decreasing of flow resistance in the scrubber on account of changed scrubbing action by operation of the first control means.

2. In an apparatus as in claim 1, said adjustable scrubber comprises a variable input throttle scrubber including said adjustment means, the first control means operating the adjustment means so as to vary the throttle.

3. In an apparatus as in claim 2, wherein the adjustable means includes an axially movable cone, said first control means operating the adjustment means for adjusting the position of the cone.

4. In an apparatus as in claim 1, said second detector means for the second control means being responsive to pressure conditions at said intake.

5. In an apparatus as in claim 4, said fan means having adjustable guide means, which are adjusted by said second control means.

6. In an apparatus for removing dust from gas, the dust being developed by a source, the apparatus including duct means having an intake for the gas, a scrubber having adjustable means to control the scrubbing action and being disposed said duct means downstream from the intake and a fan means disposed in the duct means for drawing the gas through the scrubber, the improvement comprising:

first detector means disposed in the duct means downstream from the scrubber to monitor the residual dust content of the gas having been scrubbed by the scrubber;

first feedback means connected to the first detector means and to the adjustment means for the scrubber, for controlling the scrubber toward producing a constant residual dust content, thereby causing power consumption of the fan means to track needed scrubbing operation;

second detector means disposed in the duct means and responsive to the flow condition between the dust source and the intake of the scrubber, said flow conditions change upon operation of the adjustment means; and second feedback means connected to the second detector means and to the fan means for controlling the fan means to prevent dust laden gas from bypassing the scrubber and external air from being drawn into the intake.

7. In an apparatus as in claim 6, wherein said fan means has adjustable guide vanes, the second feedback means adjusting the guide vanes.

8. In an apparatus as in claim 6, wherein said scrubber includes a throat section including said adjustable means which defines a variable ring gap which varies the throttling of flow into the scrubber, the first feedback means varying the cross-section of said ring gap.

9. In an apparatus as in claim 6, the second detector means being a pressure responsive transducer, the second feedback means operating to hold the pressure at the location of the second detector means constant.

* * * * *